(12) United States Patent
Choi et al.

(10) Patent No.: US 8,243,181 B2
(45) Date of Patent: Aug. 14, 2012

(54) DIGITAL IMAGE PROCESSING APPARATUS AND METHOD OF CONTROLLING THE SAME

(75) Inventors: Jun-kwon Choi, Suwon-si (KR); Sang-seok Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 286 days.

(21) Appl. No.: 12/633,847

(22) Filed: Dec. 9, 2009

(65) Prior Publication Data

US 2010/0157132 A1 Jun. 24, 2010

(30) Foreign Application Priority Data

Dec. 24, 2008 (KR) ........................ 10-2008-0133792

(51) Int. Cl.
*H04N 5/222* (2006.01)
(52) U.S. Cl. .................................................. 348/333.12
(58) Field of Classification Search .............. 348/333.12
See application file for complete search history.

(56) References Cited

U.S. PATENT DOCUMENTS

| | | | | |
|---|---|---|---|---|
| 5,889,242 A | * | 3/1999 | Ishihara et al. | 200/6 A |
| 6,344,618 B1 | * | 2/2002 | Sato | 200/6 A |
| 6,344,619 B1 | * | 2/2002 | Yamasaki et al. | 200/6 A |

* cited by examiner

*Primary Examiner* — James Hannett
(74) *Attorney, Agent, or Firm* — Drinker Biddle & Reath LLP

(57) ABSTRACT

A digital image processing apparatus and a method of controlling the same. The digital image processing apparatus includes a multi-direction button as a shutter release button which can move an auto focus (AF) region while a first shutter release signal is being applied. The multi-direction shutter release button is operable along the first direction which is an up and down direction, and is operable in the multiple directions which include back, front, right, and left directions. Specifically, the multi-direction shutter release button is operable to apply a first shutter release signal when moved down along the first direction to a first position, to allow for auto focusing operations in accordance with movement in any of the multiple directions, and is operable to apply a second shutter release signal when moved down along the first direction to a second position to control the digital image processing apparatus to operate a shutter to capture an image.

12 Claims, 5 Drawing Sheets

DIGITAL IMAGE PROCESSING APPARATUS AND METHOD OF CONTROLLING THE SAME

CROSS-REFERENCE TO RELATED PATENT APPLICATION

This application claims the benefit of Korean Patent Application No. 10-2008-0133792, filed on Dec. 24, 2008, in the Korean Intellectual Property Office, the entire content of which is incorporated herein by reference.

BACKGROUND OF THE INVENTION

1. Field of the Invention

The present invention relates to a digital image processing apparatus and a method of controlling the same. More particularly, the present invention relates to a digital image processing apparatus including a multi-direction button as a shutter release button which can move an auto focus (AF) region while a first shutter release signal is being applied, and a method of controlling the digital image processing apparatus.

2. Description of the Related Art

As understood in the art, digital image processing apparatuses process images captured by digital cameras, personal digital assistants (PDAs), phone cameras, and personal computer (PC) cameras or employ motion recognition sensors. A digital image processing apparatus may receive a desired image via a photographing device, display the received image on an image display device, store the image as an image file according to selection of a user, and print the stored image file.

Figure 1A:
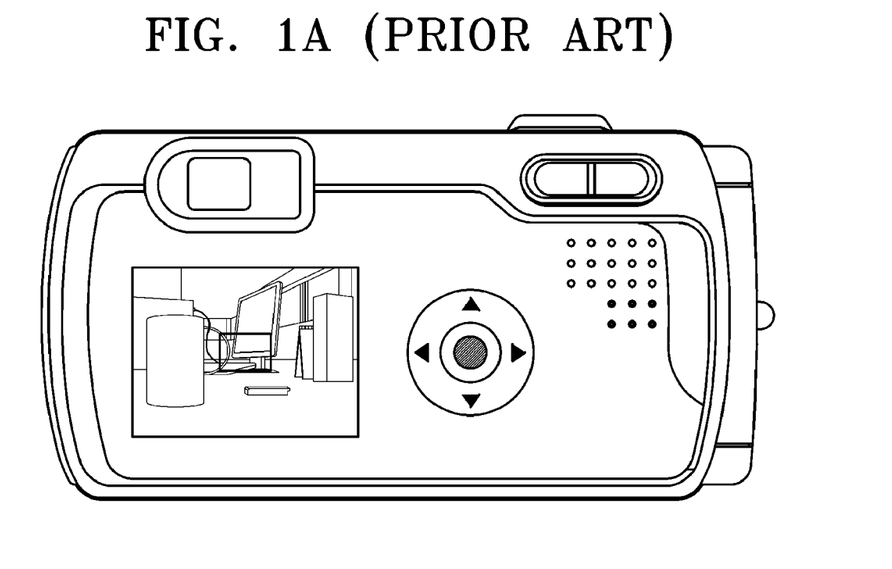
FIGS. 1A through 1C are rear views of a digital image processing apparatus for explaining conventional methods of selecting regions.
Figure 1B:
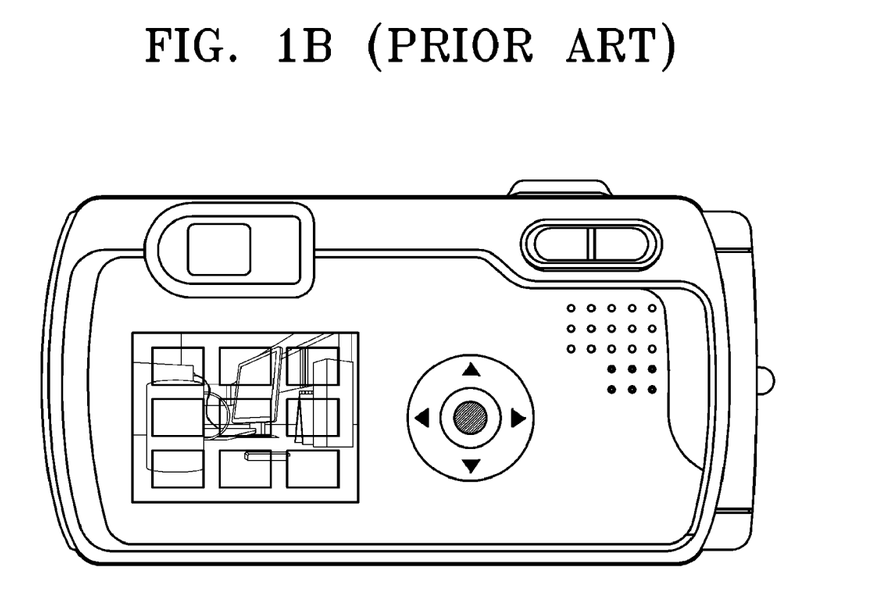

The digital image processing apparatus extracts data required for auto focus (AF) from a predetermined region in order to enable an AF function. In this case, selection of a region is limited as shown in FIGS. 1A and 1B. Specifically, a previously determined region may be selected or center AF or multi-AF may be selected. Also, before capturing an image, a complicated process including selecting a menu, selecting a region selection menu, and selecting a region should be performed.

FIG. 1A is a view of a digital camera for explaining a center AF method. In the center AF method, a screen is divided into a plurality of fixed regions, a predetermined region is selected from the fixed regions, AF processing is performed on the selected region, and a photographing operation is performed. FIG. 1B is a view of a digital camera for explaining a multi-AF method. In the multi-AF method, a screen is divided into a plurality of fixed regions, AF processing is performed on the respective fixed regions, and a photographing operation is performed.

Figure 1C:
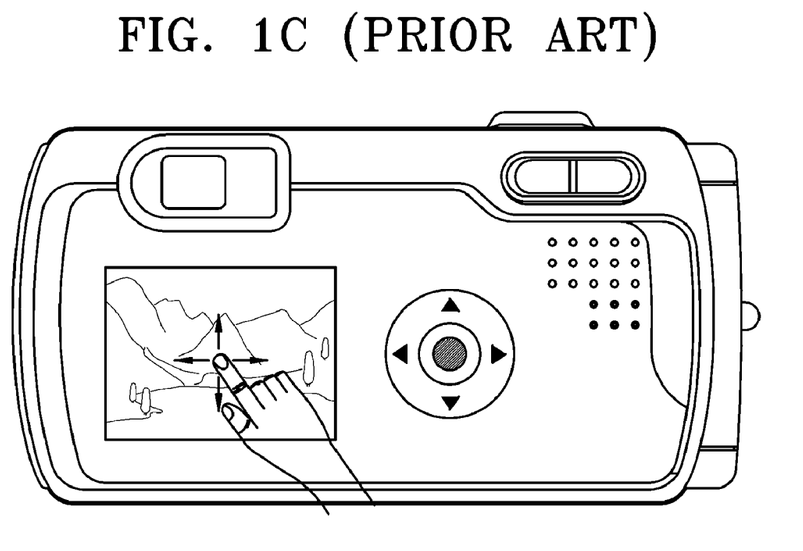

Also, as shown in FIG. 1C, a method of performing AF, in which a user uses a touch pad and selects a specific subject on a touch pad liquid crystal display (LCD), has been provided. However, in the conventional digital image processing apparatus, while a user is concentrating on a subject via a viewfinder or a display screen for photographing, it is not easy to move an AF region. In other words, in order to move an AF region while a user is half-pressing a shutter, the user has to stop photographing for a moment, move the AF region by pressing a direction key or touching a touch screen, and then perform the photographing operation. However, in this process, the user may miss a moment that he or she wishes to photograph, and also it may take a long time to set the composition again.

Accordingly, most photographers input an AF locking button to fix a focus without using a focus region selection function, and then move a camera to adjust the focus while half-pressing a shutter. However, in this case, AF deviation may occur due to an error caused by the movement of the camera.

As described above, in selecting an AF region, a conventional digital image processing apparatus cannot adequately move an AF region while a shutter is half-pressed.

SUMMARY OF THE INVENTION

Accordingly, an embodiment of the present invention provides a digital image processing apparatus including a multi-direction button as a shutter release button which can move an auto focus (AF) region while a first shutter release signal is being applied, and a method of controlling the digital image processing apparatus. The multi-direction button may be operated back B, front F, right R and left L. While the shutter release button is pressed to apply a first shutter release signal, the shutter release button may be operated back B, front F, right R and left L to generate a predetermined input signal. Also, while the shutter release button is pressed to apply the first shutter release signal, the shutter release button may be operated back B, front F, right R and left L to move an auto focus (AF) region.

In addition, while the shutter release button is pressed to apply the first shutter release signal, the shutter release button may be operated back B, front F, right R and left L to perform at least one operation selected from the group consisting of white balance adjustment, auto exposure lock (AE LOCK), zoom control. While the first shutter release signal is being applied, when a direction moving signal is applied, the digital image processing apparatus may further include a digital signal processing (DSP) unit controlling the digital image processing apparatus so as to move the AF region according to the direction moving signal. The DSP unit may control the digital image processing apparatus so that the AF region moves according to the direction moving signal and AF may be automatically performed with respect to the AF region at the same time.

Another embodiment of the present invention provides a method of controlling a digital image processing apparatus. The method includes applying a first shutter release signal, and while the first shutter release signal is being applied, applying an AF region moving signal, and moving the AF region according to the AF region moving signal. The digital image processing apparatus may include a multi-direction button as a shutter release button, and the AF region moving signal may be applied by operating the multi-direction button back B, front F, and right R and left L. While the first shutter release signal is being applied, the applying of the AF region moving signal may include applying the AF region moving signal by operating the shutter release button back B, front F, and right R and left L while the shutter release button is pressed to apply the first shutter release signal.

The method may further include, after the AF region is moved according to the AF region moving signal, automatically performing AF with respect to the moved AF region. The moving of the AF region according to the AF region moving signal may include displaying a moving path of the AF region on a display unit in real-time.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Hereinafter, the present invention will be described in detail by explaining exemplary embodiments of the invention with reference to the attached drawings.

Figure 2:
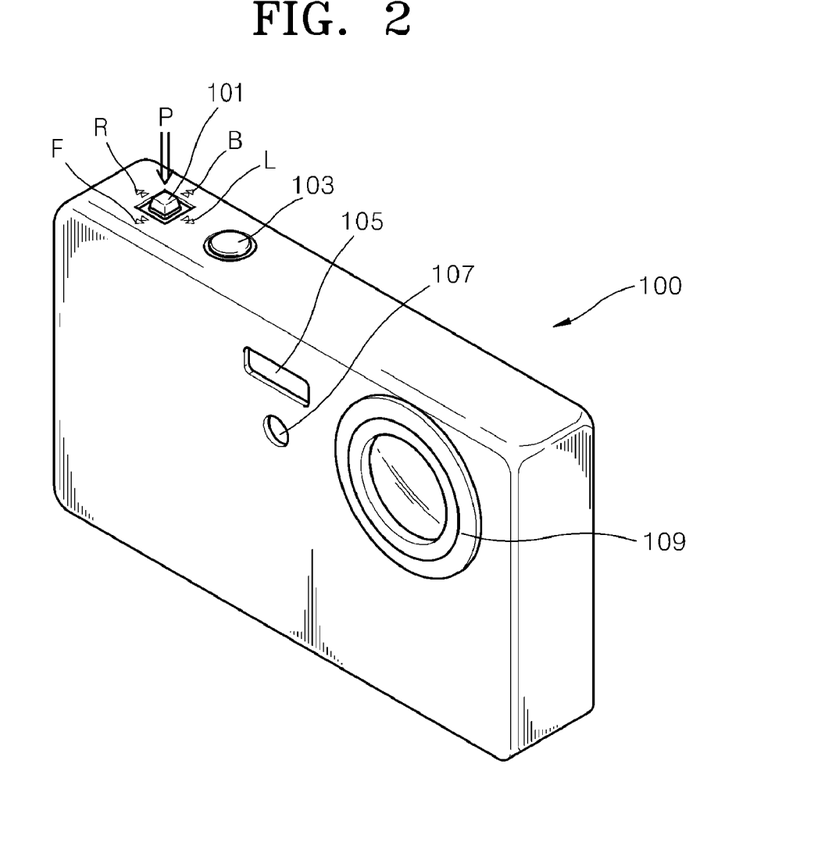
FIG. 2 is a perspective view of a front side and a top side of an example of a digital image processing apparatus according to an embodiment of the present invention.

FIG. 2 is a perspective view of a front side and a top side of a digital image processing apparatus 100 according to an embodiment of the present invention. The digital image processing apparatus 100 includes a shutter-release button 101, a power button 103, a flash 105, a sub-light 107, and a lens 109.

When the power button 103 is pressed, power is supplied to the digital image processing apparatus so that the digital image processing apparatus can operate. In this state, when the shutter-release button 101 is pressed, a charge-coupled device (CCD) or a film is exposed to light for a predetermined time via an iris diaphragm (not shown) and the lens 109 so that an image of a subject to be photographed is recorded in the CCD.

When the shutter-release button 101 is pressed by a user, first and second image capturing signals are generated. When the shutter-release button 101 is half-pressed, the digital image processing apparatus adjusts the focus and controls the amount of light entering the lens 109. When the focus is properly adjusted, a green light lights up on a display unit (refer to 113 in FIG. 3). After the focus is adjusted and the amount of light is controlled by half-pressing the shutter-release button 101, the shutter-release button 101 is fully pressed to photograph the subject. The shutter-release button 101 will be described later in detail.

The flash 105 is used to instantaneously illuminate the subject when a photographing operation is performed in a dark place. Flash modes include an automatic mode, a forced flash mode, a flash-off mode, a red-eye reduction mode, and a slow-sync flash mode.

The sub-light 107 supplies light to the subject such that in the case of a lack of light or night photography, the digital image processing apparatus can automatically adjust the focus in a rapid and accurate way. The lens 109 receives light reflected off the subject and processes an image of the subject.

Figure 3:
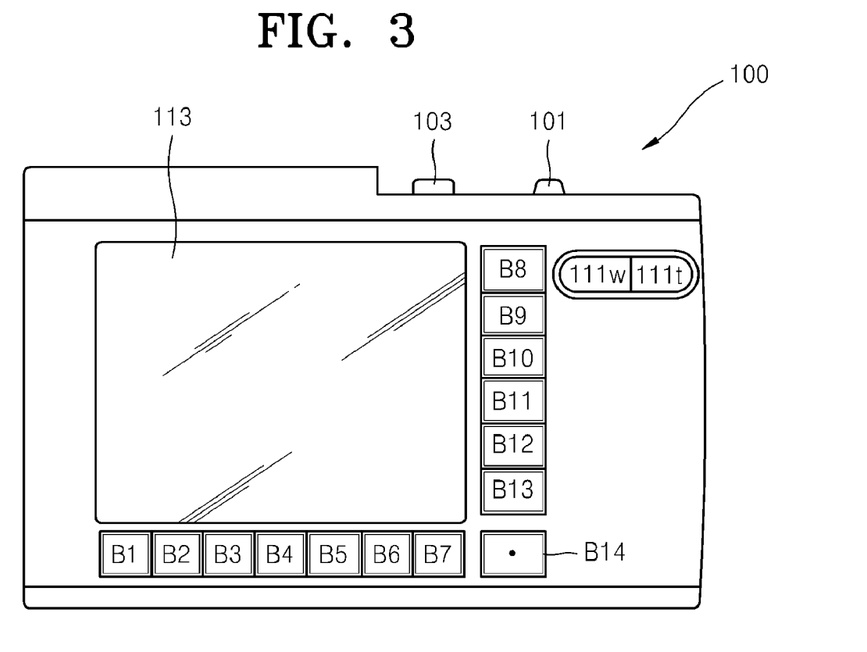
FIG. 3 is a rear view of the digital image processing apparatus shown in FIG. 2.

FIG. 3 is a rear view of the digital image processing apparatus 100 shown in FIG. 2. The digital image processing apparatus 100 further includes a wide-angle zoom button 111w, a telephoto zoom button 111t, the display unit 113, and input buttons B1 to B14 (hereinafter, referred to as 'buttons B1 to B14'), wherein each button may include a touch sensor (not shown) or a contact switch (not shown).

The wide-angle zoom button 111w or the telephoto zoom button 111t is pressed to respectively increase or decrease an angle of view, thereby changing the size of a selected region to be photographed. When the wide-angle zoom button 111w is pressed, the size of the selected region is reduced. When the telephoto zoom button 111t is pressed, the size of the selected region is enlarged.

The buttons B1 to B14 are arranged in a column and a row beside and below the display unit 113. Each of the buttons B1 to B14 arranged along the lateral and bottom sides of the display unit 113 includes the touch sensor or the contact switch.

If each of the buttons B1 to B14 includes a touch sensor, each of the buttons B1 to B7 arranged in a row or each of the buttons B8 to B14 arranged in a column is touched and moved upward, downward, to the left, or to the right, so that an arbitrary value (e.g., color or brightness) may be selected out of main menu icons or one of sub-menu icons included in the main menu icons may be enabled. If each of the buttons B1 to B14 includes a contact switch, a main menu icon and a sub-menu icon can be directly selected to perform a desired function. When touch sensors are used, the operating force required is less than the operating force required for contact switches, that is, the contact switch needs to be touched more strongly than the touch sensor.

The digital image processing apparatus 100 according to an embodiment of the present invention may include a multi-direction button as the shutter release button 101. In FIG. 2, a five-direction button is illustrated as an example of the multi-direction button. In detail, the five-direction button is used to control the digital image processing apparatus 100 by being operated in the five directions back B, front F, right R, and left L, and vertically up and down by a user. That is, the five-direction button may be freely operated back B, front F, right R, and left L around the center by a user, and may also be operated vertically by being pressed in a P direction as shown in FIG. 2. However, the multi-direction button included in the digital image processing apparatus 100 according to an embodiment of the present invention is not limited to the five-direction button, and may also be a nine-direction button, which can be operated even in a diagonal direction, or other buttons which can be operated in more directions. A basic structure of the multi-direction button and a key input sensing operation according to a switch operation are well known, and thus a detailed description thereof will be omitted here.

A user presses the shutter release button 101 in a P direction shown in FIG. 2, so that first and second image capturing signals are generated similar to a general shutter release button. That is, the user sequentially inputs a first shutter release signal as a half-shutter signal and a second shutter release signal as a full-shutter signal to capture an image. At the same time, while the user is pressing the shutter release button 101 in the P direction with a predetermined pressure, that is, while the user is half-pressing the shutter release button 101, the user may move an AF region by operating the shutter release button 101 back B, front F, right R, and left L.

Conventionally, in order to move an AF region while a user is applying the first shutter release signal, the user has to stop photographing for a moment, move the AF region by pressing a direction key or by touching a touch screen, and then perform the photographing operation. In order to overcome this problem, the digital image processing apparatus 100 according to an embodiment of the present invention includes the multi-direction button as the shutter release button 101, so that the multi-direction button can perform various functions, for example, movement of the AF region, while a user is applying the first shutter release signal.

Figure 4A:
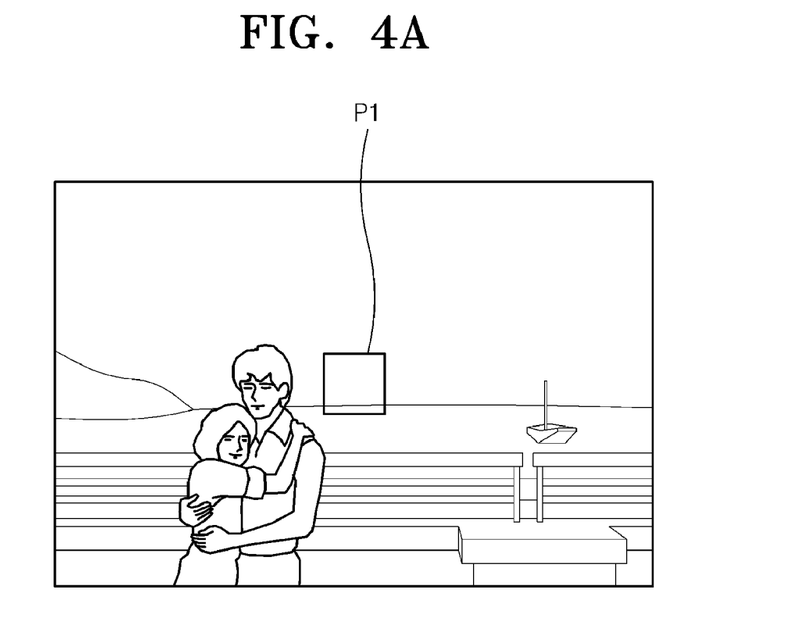
FIGS. 4A and 4B are views for explaining an example of an operation of capturing images by using a digital image processing apparatus according to an embodiment of the present invention.

For example, after the user sets a desired composition via a viewfinder or the display unit 113, the user presses the shutter release button 101 in the P direction to apply the first shutter release signal as a half-shutter signal. At this time, if center AF is set, an AF region P1 is set to the center of the display unit 113 as illustrated in FIG. 4A. As such, when the composition is fixed, if a user desires to move only a focus region to a subject, the user can move the AF region by operating the shutter release button 101 back B, front F, right R, and left L. That is, while the user is half-pressing the shutter release button 101, if the user presses the shutter release button 101 to the left L, the AF region is moved to the left as illustrated in FIG. 4B, and thus the AF region P2 is newly set as a user's desired region.

Although FIG. 4A illustrates that an initial AF region is set to the center of the display unit 113, the present invention is not limited to this arrangement. That is, the initial AF region may be set as various regions of the display unit 113 according to a user's selection or automatically.

Figures 4B, 5:
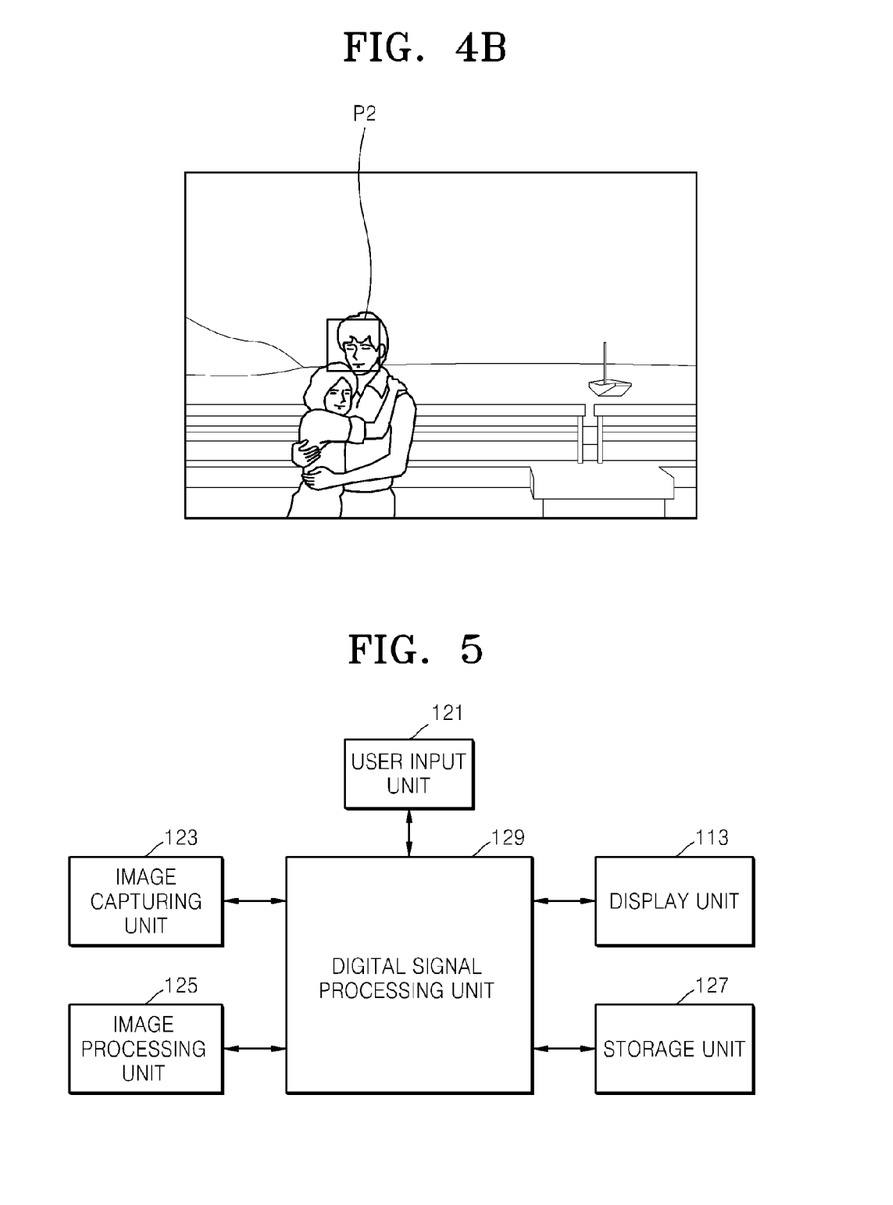
FIG. 5 is a block diagram of an example of the digital image processing apparatus shown in FIGS. 2 and 3.

FIGS. 4A and 4B illustrates the movement of the AF region as an example of functions of a multi-direction button while a user is applying the first shutter release signal, but the present invention is not limited to this arrangement. That is, while the user is applying the first shutter release signal, the user may perform white balance adjustment, AE LOCK (auto exposure lock), zoom control, etc. by operating the shutter release button 101 back B, front F, right R, and left L.

Accordingly, the digital image processing apparatus 100 may allow the user to easily set a desired region as the AF region.

FIG. 5 is a block diagram of an example of the digital image processing apparatus shown in FIGS. 2 and 3. The digital image processing apparatus 100 includes a display unit 113, a user input unit 121, an image capturing unit 123, an image processing unit 125, a storage unit 127, and a digital signal processing (DSP) unit 129.

The user input unit 121 includes the shutter release button 101, the power button 103, the wide-angle zoom button 111w and the telephoto zoom button 111t, and buttons B1 to B14. The shutter-release button 101 is operated to expose a CCD to light for a predetermined period of time. The power button 103 is pressed to supply power to the digital image processing apparatus. The wide-angle zoom button 111w or the telephoto zoom button 111t is pressed to increase or decrease an angle of view. The buttons B1 to B14 are arranged in a row and a column beside and below the display unit 113. Each of the buttons B1 to B14 may include a touch sensor (not shown) or a contact switch (not shown).

The image capturing unit 123 includes a shutter, a lens, an iris diaphragm, the CCD, and an analog-to-digital converter (ADC), although they are not shown. The shutter is a component that controls the amount of light entering the lens and the iris diaphragm. The lens receives light reflected off a subject to be photographed and processes an image of the subject. In this case, the amount of light is controlled according to an opening extent of the iris diaphragm, which is regulated by the DSP unit 129.

The CCD accumulates light received via the lens and outputs an image according to the amount of accumulated light in response to a vertical synchronizing signal. The CCD converts light reflected by a subject to be photographed into an electric signal. In order to obtain a color image using the CCD, a color filter is included in the digital image processing apparatus of an embodiment of the present invention. The color filter may be a color filter array (CFA). The CFA includes regularly arranged pixels, each pixel allowing only single-color light to pass therethrough, and may have various shapes according to the type of arrangement of pixels. The ADC converts an analog image signal output from the CCD into a digital signal.

The image processing unit 125 processes raw digital data so as to display the data. The image processing unit 125 removes a black level caused by a dark current generated in the CCD and CFA, which are sensitive to temperature variations. The image processing unit 125 gamma encodes data in conformity with the non-linearity characteristics of human vision. The image processing unit 125 converts a Bayer pattern embodied by an RGRG line and a GBGB line of the gamma encoded data into an RGB line using CFA interpolation. The image processing unit 125 converts an interpolated RGB signal into a YUV signal, performs an edge compensation process of filtering a Y signal using a high pass filter (HPF) to process an image clearly, performs a color correction process of correcting color values of U and V signals using a normal color coordinate system, and eliminates noise from Y, U, and V signals. The image processing unit 125 compresses and processes the Y, U, and V signals, from which noise is eliminated, to generate a joint photographic coding experts group (JPEG) file, and the generated JPEG file is displayed on the display unit 113 and stored in the storage unit 127. The above-described operations of the image processing unit 125 in this example are controlled by the DSP unit 129.

While a first shutter-release signal is being applied to the digital image processing apparatus 100, when a direction moving signal is applied, the DSP unit 129 controls the digital image processing apparatus such that an AF region moves according to the direction moving signal and is displayed on the display unit 113 at the same time. That is, after a user inputs the first shutter-release signal, while the first shutter-release signal is being applied, if the user operates the shutter-release button (refer to 101 in FIG. 2) back B, front F, right R, and left L, the digital image processing apparatus 100 controls the digital image processing apparatus such that the AF region moves according to the operation of the shutter-release button 101 and the AF is automatically performed with respect to the moved AF region at the same time.

As such, when the setting of the AF region is finished, the DSP unit 129 stores the raw data image, of which AF is focused on the setting region, in the storage unit 127. The DSP unit 129 receives a second shutter-release input signal, captures the corresponding preview image, and stores the JPEG file which has undergone the signal processing in the storage unit 127.

An example of a method of controlling a digital image processing apparatus according to an embodiment of the present invention will be described with reference to FIG. 6. The method of processing the image may be performed in the digital image processing apparatus as illustrated in FIG. 5. In this embodiment, an algorithm for operating the digital image processing apparatus may be performed in the DSP unit 129 by the aid of peripheral components.

Figure 6:
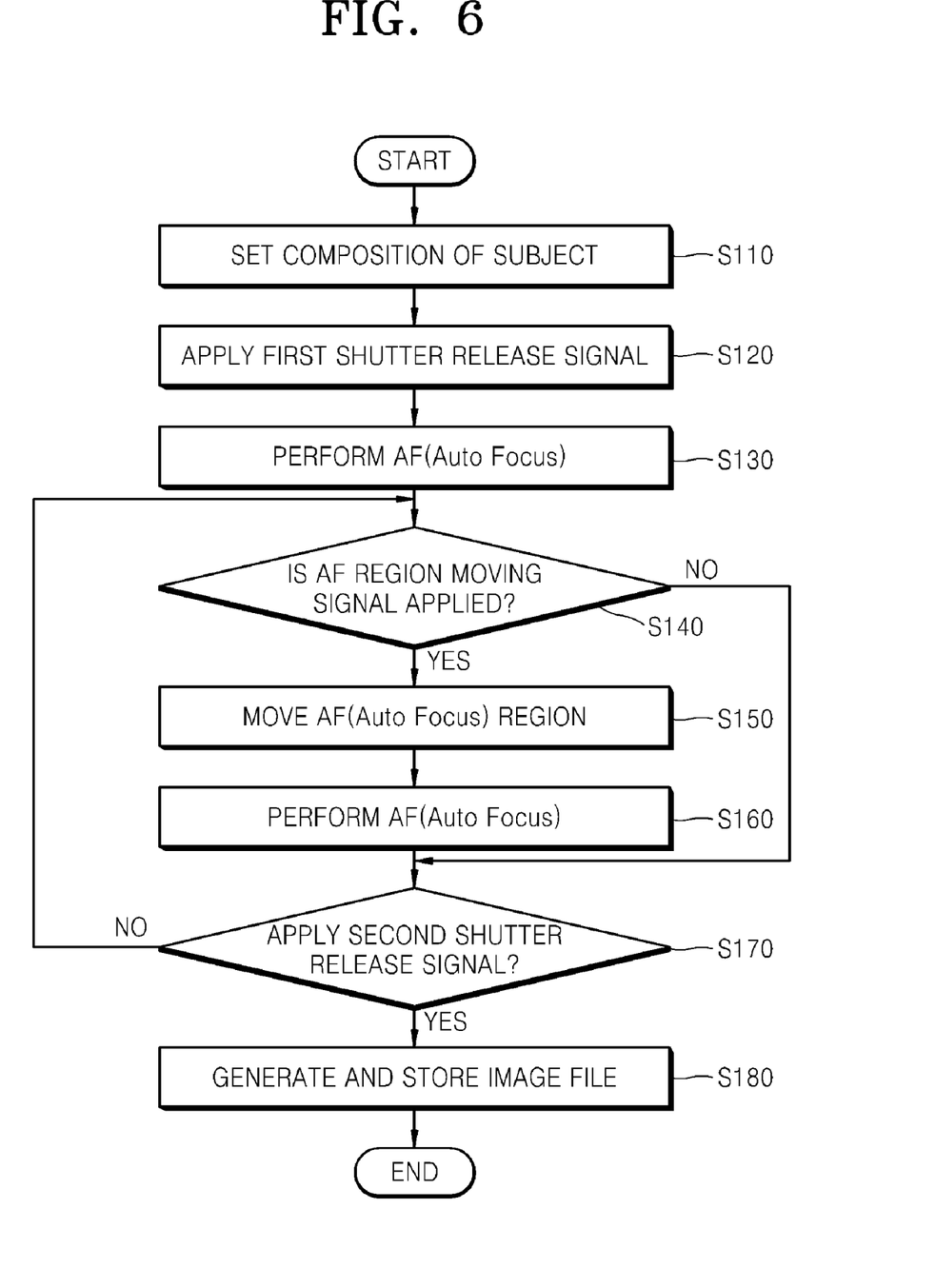
FIG. 6 is a flowchart illustrating an example of a method of controlling a digital image processing apparatus according to an embodiment of the present invention.

Referring to FIG. 6, the method of controlling the digital image processing apparatus according to an embodiment of the present invention includes setting the composition of a subject (operation S110), applying a first shutter release signal (operation S120), performing AF (operation S130), determining if an AF region moving signal was applied (operation S140), moving an AF region (operation S150), re-performing the AF (operation S160), determining if a second shutter release signal was applied (operation S170), and generating and storing an image file (operation S180). First, a user sets the composition of the subject (operation S110). That is, while seeing a preview image displayed on the display unit (refer to 113 in FIG. 3), the user controls the position and size of the subject to be photographed in the image.

Next, if the user inputs the first shutter release signal (operation S120), the DSP unit (refer to 129 in FIG. 3) performs AF (operation S130). Then, the DSP unit 129 determines if the AF region moving signal was applied (operation S140). As a result of the determination, if the AF region moving signal was applied, the DSP unit 129 moves the AF region (operation S150) and then re-performs AF (operation S160).

The digital image processing apparatus according to an embodiment of the present invention includes a multi-direction button as the shutter release button (refer to 101 in FIG. 2). A five-direction button exemplified as the multi-direction button may be freely operated back B, front F, right R, and left L around the center by a user, and may also be pressed vertically.

The user may press the shutter release button, so that first and second image capturing signals are generated similar to a general shutter release button. That is, the user may sequentially input the first shutter release signal as a half-shutter signal and the second shutter release signal as a full-shutter signal to capture an image. At the same time, while the user is half-pressing the shutter release button, the user may move an AF region by operating the shutter release button back B, front F, right R, and left L.

For example, after the user sets a desired composition via a viewfinder or a live view screen, the user presses the shutter release button to apply the first shutter release signal as the half-shutter signal. At this time, if center AF is set, an AF region is set to the center of the display unit 113. As such, when the composition is fixed, if a user desires to move only a focus region to a subject, the user can move the AF region by operating the shutter release button back B, front F, right R, and left L. That is, while the user is half-pressing the shutter release button, if the user presses the shutter release button to the right R, the AF region is newly set as a user's desired region.

On the other hand, the above embodiment describes the movement of the AF region as an example of functions of a multi-direction button while a user is applying the first shutter release signal, but the present invention is not limited to this arrangement. That is, while the user is applying the first shutter release signal, the user may perform white balance adjustment, AE LOCK, zoom control, etc. by operating the shutter release button 101 back B, front F, right R, and left L.

Finally, when the user sets a desired composition of the subject and an AF region, the DSP unit 129 determines if the second shutter release signal was applied (operation S170). As a result of the determination, if the second shutter release signal was applied by the user, the DSP unit 129 controls the image processing unit, generates the captured image as a JPEG image file, displays the JPEG image file on the display unit, and stores the JPEG image file in the storage unit (operation S180).

Hence, the digital image processing apparatus 100 may allow the user to easily set a desired region as the AF region.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A digital image processing apparatus comprising a multi-direction button as a shutter release button, the multi-direction button being movable along a first direction, and being movable in multiple directions transverse to the first direction,
    wherein the multi-direction button is operable along the first direction which is an up and down direction, and is operable in the multiple directions which include back, front, right, and left directions, and
    wherein the shutter release button is pressed to apply a shutter release signal when moved down along the first direction to a first position, and is pressed to apply a second shutter release signal when moved down along the first direction to a second position to control the digital image processing apparatus to operate a shutter to capture an image.

2. The digital image processing apparatus of claim 1, wherein while the shutter release button is pressed to apply the first shutter release signal, the shutter release button is operable in any of the back, front, right, and left directions to generate a predetermined input signal.

3. The digital image processing apparatus of claim 1, wherein while the shutter release button is pressed to apply the first shutter release signal, the shutter release button is operable in any of the back, front, right, and left directions to move an auto focus region displayed on a display of the digital image processing apparatus.

4. A digital image processing apparatus, comprising a multi-direction button as a shutter release button, the multi-direction button being movable along a first direction, and being movable in multiple directions transverse to the first direction,
    wherein the multi-direction button is operable along the first direction which is an up and down direction, and is operable in the multiple directions which include back, front, right, and left directions,
    wherein while the shutter release button is pressed to apply a first shutter release signal when moved down along the first direction, the shutter release button is operable in any of the back, front, right, and left directions to generate a predetermined input signal, and
    wherein while the shutter release button is pressed to apply the first shutter release signal, the shutter release button is operable in any of the back, front, right and left directions to perform at least one operation selected from the group consisting of white balance adjustment, auto exposure lock, and zoom control.

5. The digital image processing apparatus of claim 1, further comprising a digital signal processing unit which, while the first shutter release signal is being applied when a direction moving signal is applied, controls the digital image processing apparatus so as to move an auto focus region according to the direction moving signal.

6. The digital image processing apparatus of claim 5, wherein the digital signal processing unit controls the digital image processing apparatus so that the auto focus region moves according to the direction moving signal and auto focus is automatically performed with respect to the auto focus region at the same time.

7. A method of controlling a digital image processing apparatus including a multi-direction shutter release button, which is movable along a first direction and movable in multiple directions transverse to the first direction, the method comprising:
    receiving a first shutter release signal when the multi-direction shutter release button is moved down along the first direction to a first position;

while the first shutter release signal is being applied received, receiving an auto focus region moving signal based on an operation of operating the multi-direction shutter release button;

moving an auto focus region on a display according to the auto focus region moving signal; and capturing an image when a second shutter release signal is received when the multi-direction shutter release button moved down along the first direction to a second position.

8. The method of claim 7, wherein the auto focus region moving signal corresponds to the operation of the multi-direction button in at least one of a back, a front, a right, or a left direction.

9. The method of claim 7, further comprising, after the auto focus region is moved according to the auto focus region moving signal, automatically performing auto focus with respect to the moved auto focus region.

10. A method of controlling a digital image processing apparatus including a multi-direction shutter release button movable along a first direction and movable in multiple directions transverse to the first direction, the method comprising:

receiving a first shutter release signal when the shutter release button is moved down along the first direction to a first position;

while the first shutter release signal is being received, receiving an auto focus region moving signal based on an operation of the multi-direction shutter release button in any of the multiple directions; and moving an auto focus region on a display according to the auto focus region moving signal, wherein the moving of the auto focus region according to the auto focus region moving signal comprises displaying a moving path of the auto focus region on the display in real-time.

11. A multi-direction shutter release button, for use with a digital image processing apparatus, the multi-direction shutter release button being movable along a first direction, and being movable in multiple directions transverse to the first direction, wherein the multi-direction shutter release button is operable to apply a first shutter release signal when moved down along the first direction to a first position, and is operable to apply a second shutter release signal when moved down along the first direction to a second position to control the digital image processing apparatus to operate a shutter to capture an image.

12. The multi-direction shutter release button of claim 11, wherein the multi-direction shutter release button is operable along the first direction which is an up and down direction, and is operable in the multiple directions which include back, front, right, and left directions.

* * * * *

UNITED STATES PATENT AND TRADEMARK OFFICE
CERTIFICATE OF CORRECTION

PATENT NO. : 8,243,181 B2  
APPLICATION NO. : 12/633847  
DATED : August 14, 2012  
INVENTOR(S) : Jun-kwon Choi and Sang-seok Lee Page 1 of 1

It is certified that error appears in the above-identified patent and that said Letters Patent is hereby corrected as shown below:

IN THE CLAIMS:

In Claim 7, Column 9, lines 1-2, replace "the first shutter release signal is being applied received" with -- the first shutter release signal is being received --

In Claim 7, Column 9, lines 3-4, replace "based on an operation of operating the multi-direction shutter release button" with -- based on an operation of the multi-direction shutter release button --

Signed and Sealed this  
Thirteenth Day of August, 2013

Teresa Stanek Rea  
*Acting Director of the United States Patent and Trademark Office*